(12) United States Patent
Nilsson

(10) Patent No.: US 12,443,095 B2
(45) Date of Patent: Oct. 14, 2025

(54) CAMERA ARRANGEMENT COMPRISING A HOLDER CONFIGURATION FOR A CAMERA HEAD AND THE HOLDER CONFIGURATION

(71) Applicant: Axis AB, Lund (SE)

(72) Inventor: Andreas Nilsson, Lund (SE)

(73) Assignee: AXIS AB, Lund (SE)

( * ) Notice: Subject to any disclaimer, the term of this patent is extended or adjusted under 35 U.S.C. 154(b) by 89 days.

(21) Appl. No.: 18/606,248

(22) Filed: Mar. 15, 2024

(65) Prior Publication Data

US 2024/0402579 A1     Dec. 5, 2024

(51) Int. Cl.
G03B 17/56     (2021.01)

(52) U.S. Cl.
CPC ...... G03B 17/561 (2013.01); *G03B 2217/002* (2013.01)

(58) Field of Classification Search
CPC ............. B60R 11/04; B60R 2011/0026; B60R 2011/0089; F16C 11/0614; F16C 11/103; F16C 17/02; F16C 23/046; F16C 2326/01; F16C 35/047; G03B 17/561; G03B 2217/002
See application file for complete search history.

(56) References Cited

U.S. PATENT DOCUMENTS

| 10,270,949 B2 * | 4/2019 | Lu ......................... G02B 27/62 |
| 11,218,625 B2 | 1/2022 | Bicudo et al. |
| 11,872,604 B2 * | 1/2024 | Tatara ....................... B60S 1/54 |
| 2009/0041452 A1 * | 2/2009 | Yoneji ..................... B60R 11/04 396/535 |
| 2017/0126938 A1 * | 5/2017 | Newiger ................ G02B 7/025 |
| 2021/0368074 A1 | 11/2021 | Bicudo et al. |
| 2022/0334364 A1 * | 10/2022 | Banerjee .............. A61B 1/0627 |
| 2023/0111985 A1 | 4/2023 | Steffes |

FOREIGN PATENT DOCUMENTS

| DE | 10237554 A1 | 3/2004 |
| FR | 2906780 A1 | 4/2008 |
| WO | 2020010468 A1 | 1/2020 |
| WO | 2022046883 A1 | 3/2022 |

OTHER PUBLICATIONS

Extended European Search Report issued on Oct. 27, 2023 for European Patent Application No. 23175923.4.

* cited by examiner

*Primary Examiner* — Amy R Hsu
(74) *Attorney, Agent, or Firm* — Volpe Koenig

(57) ABSTRACT

A camera arrangement comprises a camera head, a holder ring and a holder base. The camera head has an imaging unit and an interaction portion with constant cross section. The camera holder ring has an inner surface configured to fit onto the interaction portion of the camera head, and the camera holder base has a receptacle orifice dimensioned to receive the camera holder ring fitted onto the interaction portion of the camera head and grip an outer surface of the holder ring. The receptacle orifice has reduced dimensions due to a tightening function to fixate the camera holder ring and the camera head in relation to the camera holder base, and thereby to fixate an orientation of the camera in relation to the camera holder base. The camera holder ring is movable along a length of the interaction portion until the tightening function of the receptacle orifice has been actuated.

13 Claims, 4 Drawing Sheets

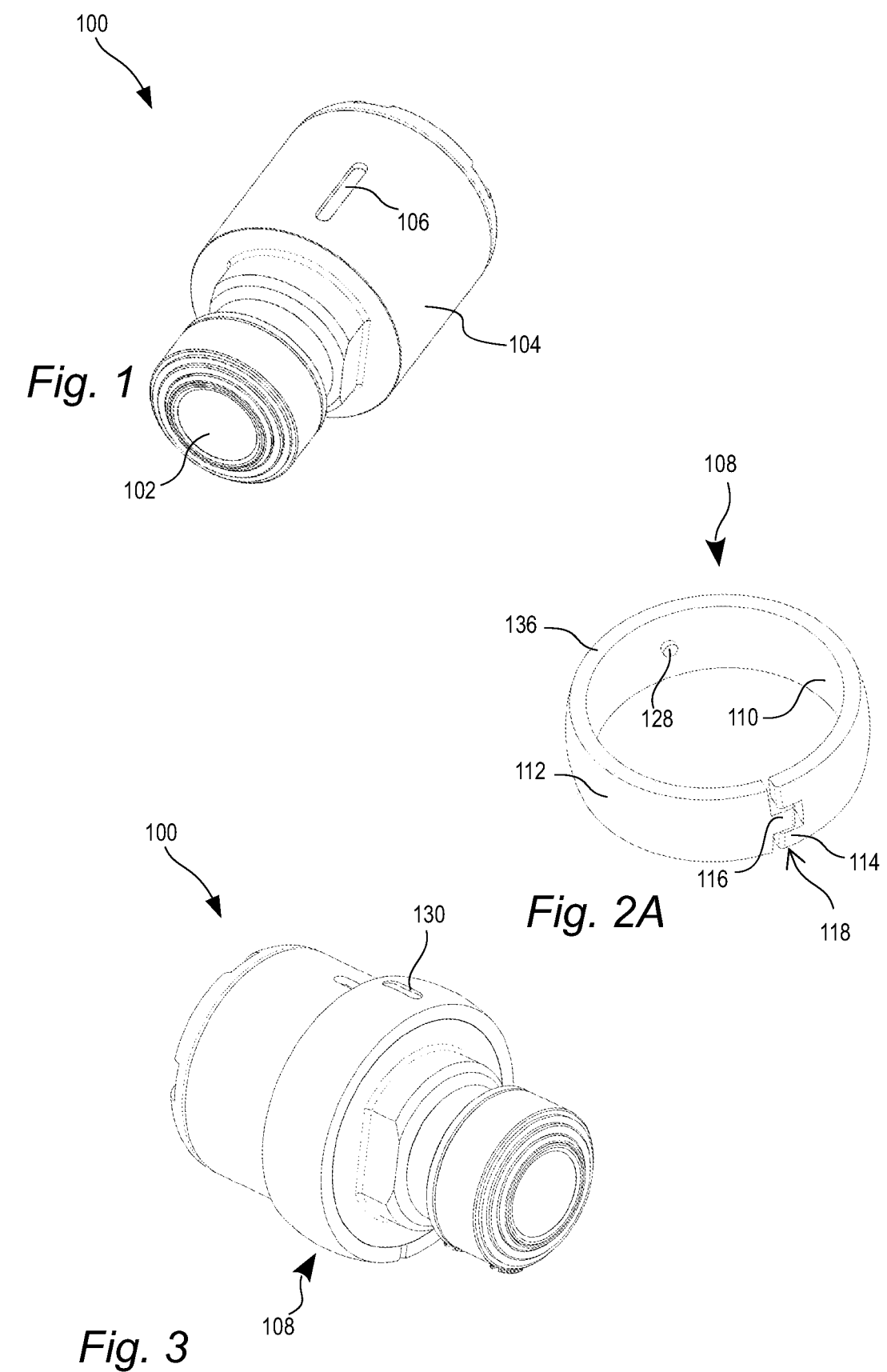

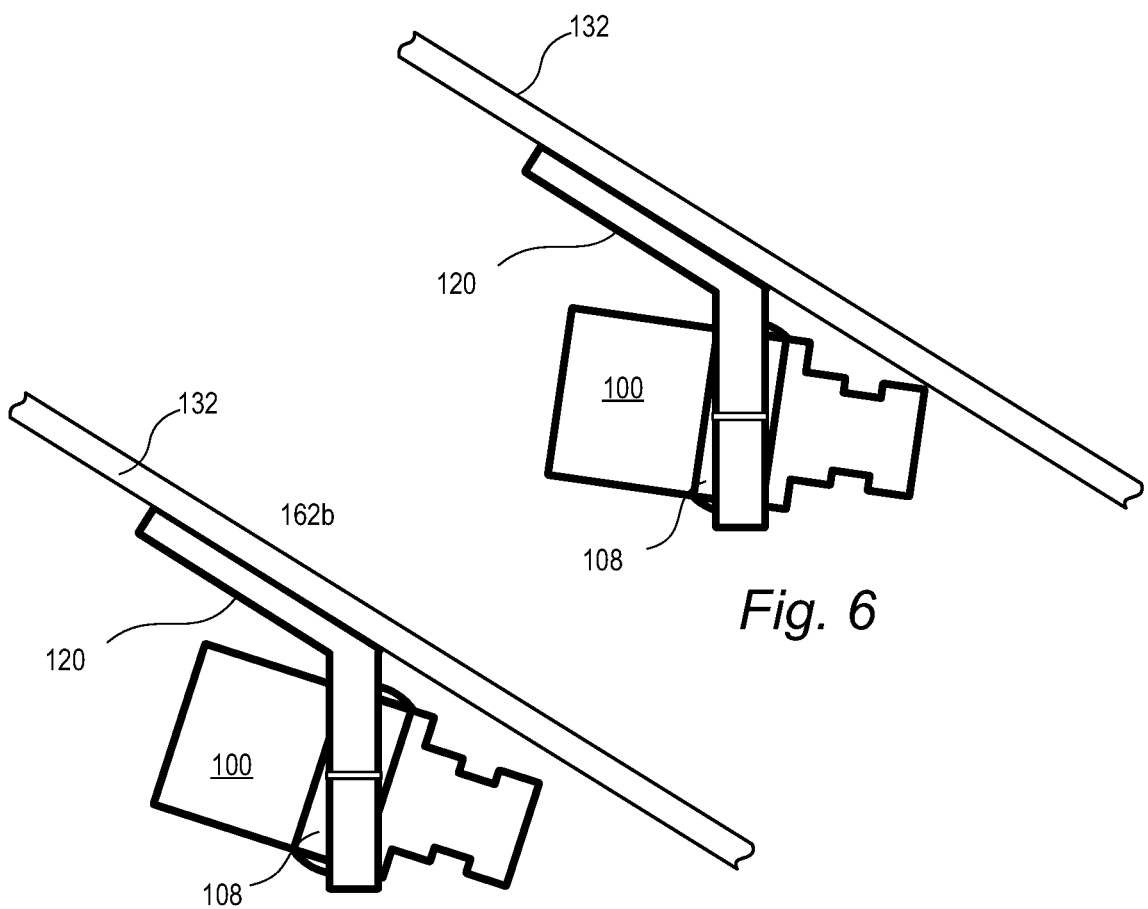
Fig. 6
Fig. 7
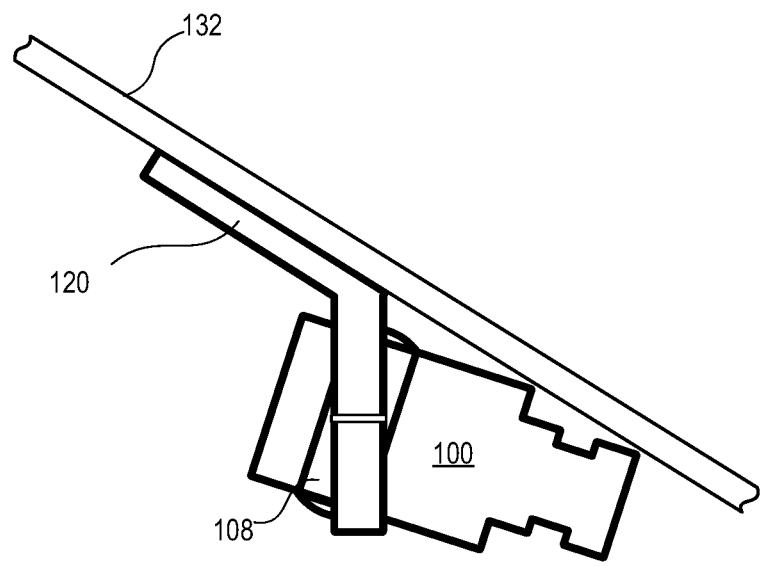
Fig. 8

CAMERA ARRANGEMENT COMPRISING A HOLDER CONFIGURATION FOR A CAMERA HEAD AND THE HOLDER CONFIGURATION

TECHNICAL FIELD

The present invention relates to a camera arrangement, and in particular to a holder configuration for a camera in a camera arrangement.

BACKGROUND

Dashboard camera systems, as well as other camera systems arranged for monitoring events involving a host vehicle are getting increasingly popular. Such kinds of vehicle-mounted cameras are often mounted on the inside of windshields (or other transparent surfaces, such as a side window or back window) in order to be protected from the environment and enabling a view of the outside surroundings of the vehicle at the same time.

The camera should be mounted so as not to interfere with the field of view of a driver (to any significant extent) and for that reason it is often mounted somewhere along the edge of the windscreen, e.g., in the area behind a rearview mirror or along the lateral edge of the windscreen at the front passenger side.

The vehicle-mounted camera will have to be oriented properly so as to obtain a desired field of view, and once oriented properly it will have to be locked in place so as not to shift its orientation as the vehicle moves.

A common way to solve this is some sort of ball-socket mount, where a holder comprising a ball (or socket) is attached to the windscreen by means of a vacuum clamp (a suction cup) or adhesive and wherein the camera head is attached to the holder by means of a socket (or ball).

An improved version of this type of such a ball-socket mount is presented in US 2021/368074, wherein the camera housing itself comprises a ball-shaped structure which matingly fits with an aperture of a mount that may be attached to the windshield. The ball-shaped structure may be integrally formed with the camera housing, or formed as a separate component fixed to the housing by means of fasteners or adhesive. The document discloses that an advantage of this improved version is that the ball-shaped structure may be formed at a position in relation to an imaging unit of the camera, such that a distance between the imaging unit and an intended visual target may be kept constant.

WO2022/046883 discloses a spherical joint that couples an accessory to a support. The spherical joint comprises a collar, a cup, and a ball head, wherein the collar is configured to house the ball head and the ball head is configured to couple to one of an accessory or a support via a mount interface.

FR2906780 discloses an electronic device for dynamic control of the stability of a motor vehicle. The device comprises a support and a housing, each having an attachment point, and the attachment points are connected together by a cage in which the ball of a ball joint is arranged. The cage is integral with one of the attachment points, while the ball joint is integral with the other attachment point. An adjustable positioning means comprise clamping means of the cage around the ball joint for locking the housing in a fixed position with respect to the support.

The present invention aims at providing a further improved holder configuration in relation to prior art, and in particular to a problem of interfering glare induced by reflections in the windshield, a problem which in the cited document is alleviated by an extra component, an anti-reflection shroud.

SUMMARY OF THE INVENTION

The present invention aims at eliminating or alleviating some problems in prior art by the provision of a camera arrangement. The camera arrangement comprises a camera head, a camera holder ring and a camera holder base. The camera head has an imaging unit, an interaction portion with a defined, preferably constant or essentially constant, cross section, where the imaging unit may form part of the interaction portion. The camera holder ring has an inner surface configured to fit onto the interaction portion of the camera head and the camera holder base has a receptacle orifice dimensioned to receive the camera holder ring fitted onto the interaction portion of the camera head and grip an outer surface of the holder ring. Moreover, the receptacle orifice has a tightening function such that its dimensions may be reduced so as to fixate the camera holder ring and the camera head in relation to the camera holder base, and thereby to fixate an orientation of the camera in relation to the camera holder base. The camera arrangement is characterized in that the camera holder ring is configured to be movable along a length of the interaction portion until the tightening function of the receptacle orifice has been actuated.

The cooperation between the interaction portion and the holder ring enables translation of the camera head in an axial direction, which in turn may enable glare avoidance. Furthermore, the invention enables a versatile solution adaptable to surfaces of different inclinations in that both orientation and axial position may be varied when in a mounted position.

In one or more embodiments the outer surface of the camera holder ring is domed in an axial direction, and the receptacle orifice has a domed inner surface configured to receive the domed outer surface of the camera holder ring. Other shapes are not impossible, yet domes surfaces will ensure a better contact as the camera head with the holder ring mounted is tilted in the receptacle orifice. As will be disclosed in the following a spherical surface is likely to be the optimal shape, yet deviations from this optimal shape are still possible, in particular if the properties of the material used for the components are adapted (a softer material will be more forgiving to shape).

In any embodiment the camera holder ring has an annular shape with an axial slit, such that it has a first and a second end meeting at a portion on its circumference. The axial slit enables, regardless of the shape of the camera holder ring, of greater flexibility of the holder ring. This is true for whatever material the ring is made from, and therefore a more rigid material may be used while still allowing for the holder ring to fit onto the camera head and to be compressed so as to hold it securely in place. The inner surface of the ring may have a different shape than circular, depending on the shape of the interaction portion. The slit may be expanded when as the holder ring is arranged onto the interaction portion (i.e. the ring may be opened), and as the holder ring engages onto the interaction portion a small slit may still be present, so as to allow for a slight further decrease in size during tightening.

In an embodiment relating to the previous embodiment the first and the second end meets in an interlocking manner, where portions of the first end overlaps in a peripheral direction with portions of the second end. To have two free ends meeting at a slit may make the holder ring prone to be skewed out of shape, from a ring shape to a spiral shape. Having physically interlocking ends, will prevent this from happening.

In a further refinement of this embodiment a portion over which the first and the second end overlaps has a length exceeding the length extension needed when arranging the holder ring on the interaction portion of the camera head. Having an overlap with these properties ensures that there is no displacement of the ends during any part of the procedure of assembling the arrangement. This will simplify every step of an assembly process.

In one or more embodiments the camera head has a guiding arrangement extending along a part of the length of the interaction portion, and the holder ring has guiding means that is configured to interact with the guiding arrangement to maintain the holder ring on the interaction portion. The enablement of guiding will simplify the assembly of the arrangement and also orienting the camera head when in an assembled position. The guiding arrangement may also maintain the camera arrangement in an assembled position even before the receptacle orifice has been tightened. This will aid during an assembly process, in particular when the arrangement is positioned in a location that is hard to reach. The feature will also enable for the camera head with the holder ring arranged thereon to be pushed into engagement with the receptacle orifice with some force, e.g., it may essentially be snapped into place without disengaging, which simplifies assembly.

One way of providing this is that the guiding arrangement is a groove or a ridge and wherein the guiding means is a protrusion or indentation of a radially inner surface of the holder ring.

The components, mainly the holder ring and the holder base may be made of a material is selected from the group comprising: polymer, such as plastic, such as thermoplastic or hardened plastic, reinforced polymer, and metal, or a combination thereof. The list of material is not exhaustive, and different materials may have different advantages. The arrangement as a whole should be dimensionally stable, but apart from that the exact choice of material may be left up to the skilled person given the application.

If inherent properties of the material do not provide sufficient grip, or if there is a desire to increase the grip, the outer surface of the holder ring may be given a textured surface or be provided with a coating, so as to increase a grip between the holder ring and the receptacle orifice. This may not only be applied to enhance the grip between the holder ring and the receptacle orifice, yet this is where the forces that tries to shift the arrangement out of orientation may be the strongest (or an interaction surface is the smallest).

In one or several embodiments the outer surface of the holder ring has the shape of a symmetrical spherical segment, i.e., the outer surface of the holder ring follows the shape of a segment of a sphere taken along a great circle as centerline, whereas the inner surface of the holder ring has an essentially constant diameter, except for any guide means arranged thereon or therein. This embodiment is believed to provide the optimal shape, in that the outer surface will be perfectly symmetrical and thus be oriented and rotated in the receptacle orifice effortlessly. A "symmetrical spherical segment" should be defined as "has the form of a segment of a sphere". Using a symmetrical spherical segment shape will ensure constant contact between the holder ring and the receptacle orifice (having the same shape), within the physical constraints of the components, obviously. The dimensions of the holder ring and the receptacle orifice will consequently be based on the desired shift in orientation possible.

It is preferred that the holder base, in one or more embodiments, has two functional portions. A first portion comprises the receptacle orifice and a second portion, formed at an angle from the first portion, comprises an inclined attachment surface. The attachment surface may be used for the application of, e.g., a double-sided tape or similar. As was the case for the holder ring, the holder base may be made of a material from the group comprising: polymer, such as plastic, such as thermoplastic or hardened plastic, reinforced polymer, and metal, or a combination thereof. A fastening point for a cable guide and/or a cable strain relief may be arranged on or in the second portion of the holder base.

According to another aspect the present invention relates to a holder configuration for a camera comprising a holder ring and a holder base as described in the above or in the following. The holder ring and holder base may be provided as a kit of parts, where the interior shape of the holder ring may be adapted to an outer shape of a camera head. In this way one and the same holder base may be used to accommodate several different camera heads by means of adjusting the interior shape of a simple (in terms of cost and manufacturing) component, i.e., the holder ring.

BRIEF DESCRIPTION OF THE DRAWINGS

FIG. 1 illustrates a camera head that may be used in a camera arrangement according to one embodiment of the present invention.

FIG. 2A illustrates a holder ring that may be used in a holder configuration according to one embodiment of the present invention.

FIG. 3 illustrates the camera head of FIG. 1 with the holder ring of FIG. 2 arranged thereon.

FIG. 6 illustrates schematically a camera arrangement according to one embodiment of the invention arranged on a slanting windscreen of a vehicle.

FIG. 7 shows the camera arrangement of FIG. 6 arranged at a slightly shifted orientation.

FIG. 8 shows the camera arrangement of FIGS. 6 and 7 arranged at the orientation of FIG. 7 yet shifted in an axial direction in accordance with an embodiment of the present invention.

DETAILED DESCRIPTION OF EMBODIMENTS

FIG. 1 is a perspective view of a camera head 100 in isolation. The camera head 100 contains an imaging unit, in the present embodiment provided with imaging optics 102 (only the front lens is visible in FIG. 1), used to image a scene onto an imaging sensor (not visible), and image processing capabilities provided by hardware or software solutions in a regular manner. The image processing capabilities may be those of a regular camera, where an encoded image stream is provided by the camera head, yet it may also be more rudimentary, in which case a partly or fully unprocessed image stream will be transmitted to processing at another location. For the product depicted the situation is the latter, and the stream is transmitted to a central processing unit via a cable, yet for the purposes of the present invention that limitation is of no consequence.

The camera head comprises an interaction portion 104 having an essentially constant cross-section (e.g., being cylindrical, with circular or elliptical cross section, or a cuboid prism, polygonal prism etc.) into which a guiding groove 106 may be arranged. Depending on the material used for the holder ring it could absorb some variation in cross section over an axial length of the interaction portion, though the more constant the better. In FIG. 1 the shape of the interaction portion 104 is cylindrical with a circular cross section, which is considered to be the most straightforward shape. The interaction portion may be embodied as the camera body, i.e., the part of the camera head containing the image sensor and other electronics, such as image processing hardware and communication hardware. The interaction portion may also be any other portion of the camera, provided that it fulfills the physical properties in terms of shape. The imaging unit and the interaction portion does not have to be formed from two or more distinguishable parts, an example being the present embodiment where part of the imaging unit (the image sensor) is positioned inside a camera housing, the outer surface of which provides the interaction portion, and only the optics unit extend from the camera housing. The camera will always contain an image sensor and thus an imaging unit, yet lenses may be provided separately and be replaceable. In other embodiment a fixed lens system is used, and in that case the imaging unit will also contain an optics unit.

Figure 2B:
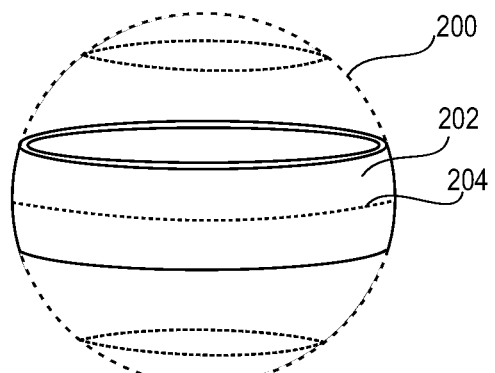
FIG. 2B is a schematic view clarifying the geometrical properties of the holder ring of FIG. 2A.

FIG. 2A illustrates the holder ring 108. It is an annular construction with a radially inner, surface 110 matching that of the interaction portion 104 of the camera head, and a domed radially outer surface 112. The domed outer surface 112 essentially follows an arch in an axial direction with an essentially constant periphery for each axial position. For smooth operation the outer surface is that of a symmetrical spherical segment, as exemplified FIG. 2B. In FIG. 2B the meaning of "symmetrical spherical segment" 202 is clarified, and how it constitutes a symmetrical band around a great circle 204 of a sphere 200, making it uniform in every direction. This is a beneficial feature for it to be possible to adjust in every direction. Still, less beneficial shapes are possible.

The cylindrical inner surface 110 of the holder ring 108 is dimensioned to fit, directly or indirectly, onto the interaction portion 104 of the camera head 100, essentially, it encircles part of the interaction portion 104 of the camera head 100. The holder ring 108 is, in the present embodiments not a continuous ring-structure, but rather it is formed in one piece but the two ends 114, 116 of the band forming the ring are not attached to each other. They may, however, loosely interlock, so as to help in maintaining the ring shape. This is in FIG. 2A exemplified by a simplified finger joint 118 that assists in maintaining the shape of the holder ring (so that the ends are not offset).

In an alternative embodiment, not shown, the holder ring is formed in one piece, as one continuous annular shape (with whatever inner cross section that matches the cross section of the interaction portion) without any slit. In such an embodiment the holder ring would be made of a material, or combination of materials, that would allow it to be fitted onto the interaction portion 104 and transfer the clamping power of a holder base 120 (to be described), meaning that it would have some resilience. It would also, however, have to be rigid enough to stay in the grip provided by the holder base so as to maintain its designated orientation. One suitable material would be a polymer, such as rubber, yet multiple alternatives are available.

The disclosed embodiments of the holder ring are believed to be the some of the best ones in terms of simplicity and usability. More complex solutions may be realized as well, such as versions with a hinge functionality, comprising multiple interlocking parts, etc.

Returning to the embodiment of FIG. 2A, as the holder ring 108 is fitted onto the interaction portion 104 of the camera head 100 the holder ring will expand slightly and preferably maintain its position, temporarily, by friction and its inherent resilience.

In FIG. 3 the holder ring 108 is shown arranged on the camera head 100.

Figure 4:
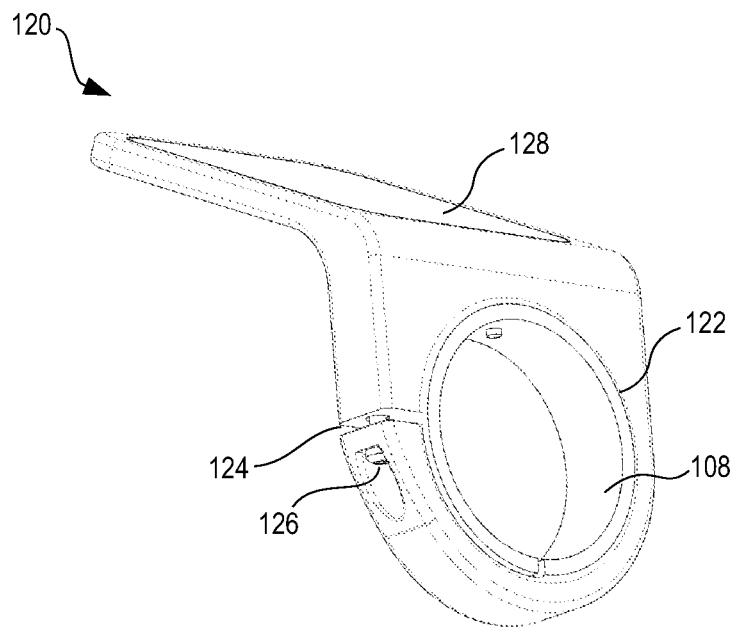
FIG. 4 illustrates a holder base in accordance with one embodiment of the invention.

FIG. 4 illustrates the holder base 120, with the ring arranged therein.

The holder base has a receptacle orifice 122 that is dimensioned to, when in a relaxed state, receive the holder ring 108 (and the camera head 100). It also has a tightening functionality, provided by a slit 124 and a screw 126, so that a diameter, or circumference, of the receptable orifice 122 may be reduced by use of the tightening functionality, i.e., by tightening of the screw 126 and reduction of the slit 124. The inner surface of the receptacle orifice 122 has a domed or spherical curvature matching that of the outer surface of the holder ring 108.

The tightening of the receptacle orifice may be affected in several different ways, one being a screw as used in the present embodiment, other including other types of screws, or manually actuated tightening mechanisms, such as an eccentric actuator, as known in the art.

Regardless of the method of tightening the generated pressure will shrink the holder ring 108 and make it turn press against the camera head 100, with its inner surface. As the arrangement is tightened further the receptacle orifice will press, and thereby lock, the holder ring 108 and the camera head 100 in relation to the holder base 120. In this way both the orientation and the axial position of the camera head 100, will be fixated.

The holder base 120 also comprises a slanted surface 128, configured for direct or indirect attachment to a windshield (or other structure) enabling arrangement of the camera head such that it may observe the desired area. The angle of the slanted surface 128 in relation to the portion of the holder base 120 that includes the receptacle orifice 122 may vary for different holder bases, and essentially depends on an inclination angle of the windshield in relation to the desired imaging direction.

Figure 5:
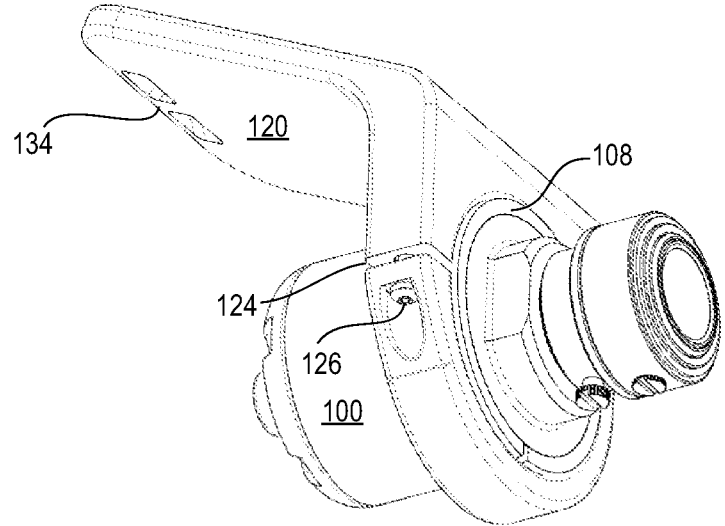
FIG. 5 illustrates the configuration of FIG. 3 arranged in a holder base according to one embodiment of the invention.

Finally, in FIG. 5 the configuration of FIG. 3 is shown as it is arranged in the holder base of FIG. 4, the slanted surface of which is adapted to be attached directly or indirectly to a windshield (or to another surface of the vehicle for that matter, such as any of the side windows, a rearward facing window, or a surface nearby these windows).

A benefit with this solution compared to prior art solutions may be clarified in reference to FIGS. 6-8. These drawings are schematic and illustrates a camera head 100 arranged on a windscreen 132 using the holder ring 108 and holder base 120 according to any embodiment From FIGS. 6 and 7 it is obvious, by comparison of the camera head position of FIG. 6 and the one of FIG. 7, that a change in orientation of the camera head 100 will change not only the desired orientation but also a distance between the camera head 100 and the windscreen (i.e., the surface to which it is attached or through which it observes the environment) due to the slanted nature of the surface (or rather, the fact that a normal of the surface in not parallel to a normal of the receptacle orifice). This change in distance may result in an increased risk of glare or other interfering reflections to reach the camera sensor. In general, the closer to the windscreen the better, since it will reduce the area of windscreen available to reflect glare into the camera and increase the possibility of any remaining glare or reflection to be sufficiently out of focus not to disturb the imaging.

Using the invention, it is possible for a single person to adjust the orientation of the camera head arranged in the holder base, then adjust the axial position of the camera head in relation to the camera head, then tighten the receptacle orifice and locking everything in place, as illustrated by FIG. 8 showing the final position of the camera head, with the orientation of FIG. 7 yet the distance to the windscreen of FIG. 6.

Figure 9:
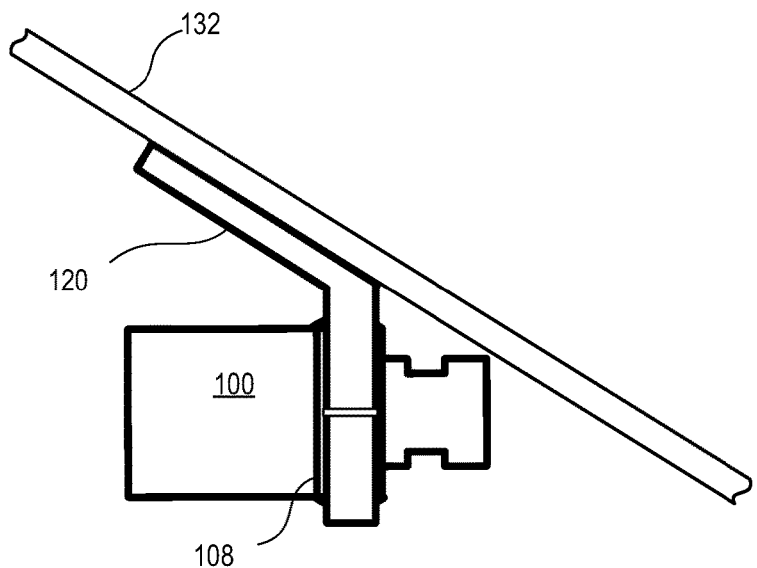
FIGS. 9-11 shows a camera arrangement according to one embodiment of the present invention mounted under various circumstances.
Figure 10:
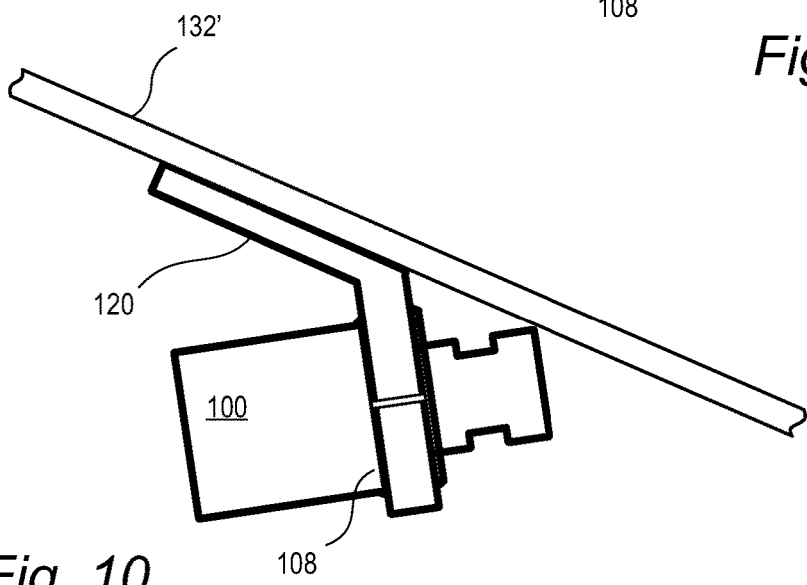
Figure 11:
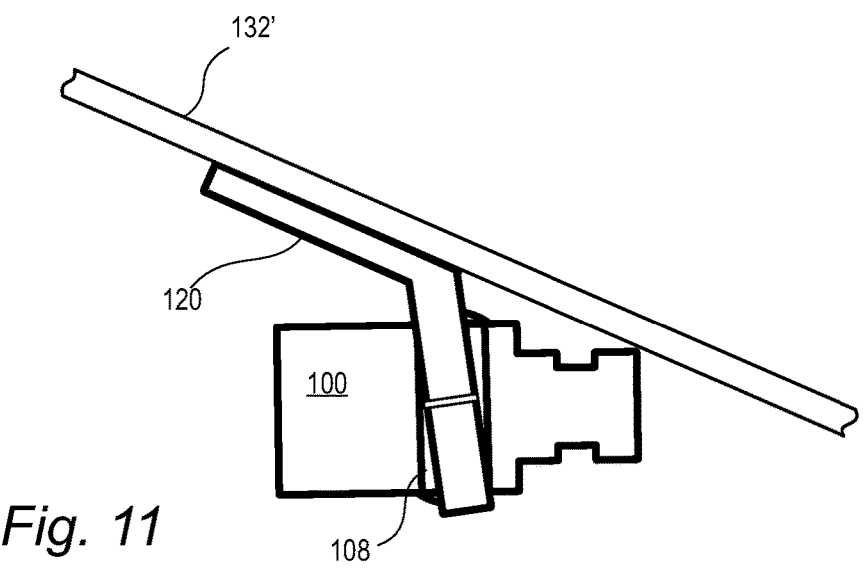

FIGS. 9-11 illustrate another situation where embodiments of the present invention are beneficial. FIG. 9 shows the arrangement with a camera head directed horizontally on a slanted windscreen 132, which is a common orientation when using the camera. FIG. 10 shows the same arrangement but on a windscreen 132' with a different slanting angle, and it is evident that the same settings will cause an unfortunate orientation of the camera head, as it will be given an upward tilt. FIG. 11 illustrates how the situation of FIG. 10 may be improved by utilizing some features of the present invention, firstly the camera head may readily be oriented horizontally, and secondly it may be translated axially to the desired position close to the windscreen 132' (or whatever axial position seems to be fortunate for the situation at hand).

FIGS. 1 and 2A actually illustrates a further feature that may be used in embodiments of the present invention: The camera head may be provided with an axial groove, as already mentioned (guiding groove 106), extending axially along the interaction portion of the camera head. Furthermore, the holder ring 108 may be provided, at its inner surface, with a protrusion 128, fitting in the axial groove 106. In this way the holder ring 108 will be more securely attached to the camera head 100. The inherent structural resilience of the holder ring 108 will maintain the protrusion 128 in the groove 106, and the radial extension of the groove 106 will prevent the holder ring 108 from sliding off the camera head inadvertently.

A further effect is that the camera head 100 may be extra sensitive in some areas, due to the thickness of the material, or components arranged therein. By an appropriate axial extension of the groove 106, which may or may not be continuous, it can assist in localizing the ring properly, i.e., preventing the holder ring 108 from being positioned in certain areas. Adding to the structural issues, there may also be areas of the camera head 100 that should be avoided due to detrimental effects on heat dissipation or whatnot. The extension of the groove 106 will also in this case ensure that these areas are avoided, and that the pressure of the holder ring 108, from the holder base 120, will not affect the camera head 100 in any adverse manner.

In alternative embodiments these guiding means may be provided by other constructional features without departing from the gist of the invention. The groove/protrusion may be reversed, so that the groove is present on the holder ring, and vice versa. Instead of having the extension of the groove delimiting the travel of the ring on the interaction portion, structural blocks could be provided. The interaction portion could have circumferential ridges delimiting the travel of the holder ring, whereas the holder ring merely could interact with these circumferential ridges with its edges, without the provision of any further means of interaction. In short, there are obviously numerous ways of obtaining the effect once the desire to achieve the effect has been formulated.

The holder ring 108 may have an ornamental groove 130 (see FIG. 3), which serves the purpose of communicating to a user where the guiding groove 106 is located, if needed for aiding in the procedure of positioning the camera head correctly in the holder base. Likewise, and for further aid, the holder base could have a physical mark at, e.g., a vertically upper position (in a mounted state), such that alignment of the physical mark and the ornamental groove ensures a particular position of the camera. These guiding aids may be formed as tactile elements so that they could be both visually and tactilely observed and on both sides of the elements (the holder ring and the holder base) so as to be available for view and/or feel from both sides.

For a failsafe handling a radial extension of the protrusion 128 may be dimensioned in such a way such that the holder ring 108 will not fit into the receptacle orifice if the protrusion 128 is not in the guiding groove 106.

A further feature of the holder ring 108 is that its lateral edges 136 may be dimensioned to prevent the holder ring 108 to slide out from engagement with the receptacle orifice, while still allowing for a large enough orientation range. The meaning of this is most readily understood from FIG. 5. If the camera head is oriented out of the position presented there, in one direction or the other, more and more of the holder ring would be exposed outside of the receptacle orifice. At one point too much of the holder ring could be outside of the receptacle orifice, which would be detrimental to the grip. With suitable dimensioning, however, the interaction portion itself will engage an edge of the receptacle orifice, disabling further shift in orientation and prevent disengagement. The thinner the holder ring, the smaller the orientation interval.

In any of the described embodiments a camera head may have a cylindrical shape, or at least a constant cross-section, along the portion intended for interaction with the holder ring. The longer the portion the greater the possible adjustment amount. A product suitable for use in the inventive arrangement is the AXIS F2115-R Varifocal Sensor, which has a circular cross section. Within this product segment, however, square cross sections, with or without rounded corners, are not unusual, in which case the inner surface of the holder ring 108 would have to have a mating cross section, while the outer surface would be as previously described. An advantage of the present arrangement is that a relatively simple part in terms of production and availability, the holder ring 108, is the only component that needs to be tailormade for the same arrangement to work with differently shaped camera heads. This simplifies availability and storage. As mentioned before the cross-section of the interaction portion would not have to be perfectly constant.

The holder base may also comprise a fastening point 132 for, e.g., a cable tie (or corresponding means), which can be used to secure a cable (or cables) carrying signal and power from or to the camera head. A connector (or connectors) for such a cable is usually positioned at the back of the camera head, the end opposite to the optics, and a suitable place for the fastening point is therefore the free end of the holder base, on the side facing away from the slanted surface 128. Once mounted, the cable tie will act as both a cable guide and a strain relief, protecting the more delicate connectors from excessive loads. The fastening point 132 of the present embodiment is simply a groove bridged at the middle and formed in one piece with the holder base, such that the cable tie could be fixed to it in a straightforward manner.

The material for the holder arrangement may be a polymer, e.g., plastic, such as thermoplastic or a thermosetting plastic, both commonly used for holders of various kinds. If additional strength is needed the polymer may be reinforced with fibers or metal. For further strength, parts of the holder arrangement may be made from metal, such as aluminum. In order to enhance a grip between the holder ring and the adjacent components (the camera head and the holder base) it may be made from a softer polymer, and/or have a surface for increased grip, such as a textured surface or a coating. The screw 126 would be made from metal in a conventional manner or from a polymer, and a mating thread may be arranged directly in the holder base 120. In an even simpler embodiment only a hole, or not even that, may provided, and the screw may be a self-tapping screw. In more complex embodiments a nut (not seen) is either molded into the holder base 120 or inserted via a slot (not visible) in order to be able to cooperate with the screw to tighten the receptacle orifice 122. The latter may be more complex, having the small dimensions of the product in consideration, yet it may be less prone for thread failure, and should such failure occur, it may be easier to fix.

It will be appreciated that a person skilled in the art can modify the above-described embodiments in many ways and still use the advantages of the invention as shown in the embodiments above. For example, only one shape of interaction portion has been shown, although it would be obvious to for the skilled person to adapt the present invention to camera heads having other cross sectional shapes than circular. Thus, the invention should not be limited to the shown embodiments but should only be defined by the appended claims. Additionally, as the skilled person understands, the shown embodiments may be combined.

The invention claimed is:

1. A camera arrangement comprising a camera head, a camera holder ring and a camera holder base, wherein
the camera head has an imaging unit and an interaction portion with a defined cross section,
the camera holder ring has an inner surface configured to fit onto the interaction portion of the camera head,
the camera holder base has a receptacle orifice dimensioned to receive the camera holder ring fitted onto the interaction portion of the camera head and grip an outer surface of the holder ring,
the receptacle orifice has a tightening function such that its dimensions may be reduced to fixate the camera holder ring and the camera head in relation to the camera holder base, and thereby to fixate an orientation of the camera head in relation to the camera holder base,
characterized in that the camera holder ring is configured to be movable along a length of the interaction portion until the tightening function of the receptacle orifice has been actuated.

2. The camera arrangement of claim 1, wherein the outer surface of the camera holder ring is domed in an axial direction, and wherein the receptacle orifice has a domed inner surface, also in an axial direction, configured to receive the domed outer surface of the camera holder ring.

3. The camera arrangement of claim 1, wherein the camera holder ring has an annular shape with an axial slit, such that it has a first end and a second end meeting at a portion on its circumference.

4. The camera arrangement of claim 3, wherein the first end and the second end meets in an interlocking manner, where portions of the first end overlap in a peripheral direction with portions of the second end.

5. The camera arrangement of claim 4, wherein a portion over which the first end and the second end overlap has a length exceeding the length extension needed when arranging the holder ring on the interaction portion of the camera head.

6. The camera arrangement of claim 1, wherein the camera head has a guiding arrangement extending along a part of the length of the interaction portion, and wherein the holder ring has guiding means that is configured to interact with the guiding arrangement to maintain the holder ring on the interaction portion.

7. The camera arrangement of claim 6, wherein the guiding arrangement is a groove or a ridge and wherein the guiding means is a protrusion or indentation of a radially inner surface of the holder ring.

8. The camera arrangement of claim 1, wherein the material used for the holder ring is selected from the group comprising: polymer, such as plastic, such as thermoplastic or hardened plastic, reinforced polymer, and metal, or a combination thereof.

9. The camera arrangement of claim 8, wherein the outer surface of the holder ring has a textured surface or a coating, so as to increase a grip between the holder ring and the receptacle orifice.

10. The arrangement of claim 1, wherein the outer surface of the holder ring has the shape of a symmetrical spherical segment and wherein the inner surface of the holder ring has an essentially constant cross section, except for any guide means arranged thereon or therein.

11. The camera arrangement of claim 1, wherein the holder base has two functional portions, one first portion comprising the receptacle orifice and one second portion, formed at an angle from the first portion, comprising an inclined attachment surface, wherein the holder base is made of a material from the group comprising: polymer, such as plastic, such as thermoplastic or hardened plastic, reinforced polymer, and metal, or a combination thereof.

12. The camera arrangement of claim 11, wherein the second portion has a fastening point for a cable guide or cable strain relief.

13. A holder configuration for a camera comprising a holder ring and a holder base having a receptable orifice, wherein
the camera head has an imaging unit and an interaction portion with a defined cross section,
the camera holder ring has an inner surface configured to fit onto the interaction portion of the camera head,
the camera holder base has a receptacle orifice dimensioned to receive the camera holder ring fitted onto the interaction portion of the camera head and grip an outer surface of the holder ring,
the receptacle orifice has a tightening function such that its dimensions may be reduced so as to fixate the camera holder ring and the camera head in relation to the camera holder base, and thereby to fixate an orientation of the camera head in relation to the camera holder base, characterized in that the holder ring is configured to be movable along a length of the interaction portion of the camera, until the tightening function of the receptacle orifice has been actuated.

* * * * *